United States Patent [19]
Tirrell et al.

[11] 3,809,967
[45] May 7, 1974

[54] INTERCONNECTION ASSEMBLY FOR PANEL SECTIONS OF AREA TYPE ELECTRICAL DISTRIBUTION SYSTEM

[75] Inventors: C. Barry Tirrell, Duxbury; George B. Williams, New Bedford, both of Mass.

[73] Assignee: Dole Electro-Systems, Incorporated, Palo Alto, Calif.

[22] Filed: Nov. 24, 1972

[21] Appl. No.: 309,067

[52] U.S. Cl. ........ 317/117, 174/70 R, 317/101 CM, 339/121
[51] Int. Cl. .............................................. H02b 1/02
[58] Field of Search ....... 317/99, 100, 101 CE, 117, 317/101 CM; 174/70 R, 70 B; 339/17 LC, 121, 20–24; 200/166 PC

[56] References Cited
UNITED STATES PATENTS

| | | | |
|---|---|---|---|
| 3,701,958 | 10/1972 | Jaag | 317/101 CM |
| 3,594,684 | 7/1971 | Miller | 200/159 B |
| 3,068,376 | 12/1962 | Hammell | 174/70 R |
| 3,614,297 | 10/1971 | Carlson | 174/70 B |
| 3,553,675 | 1/1971 | Shaver | 174/70 R |

OTHER PUBLICATIONS
Pamphlet "Rex–Flex Stainless Steel Flexible Tubing-- for Aircraft Applications," Published Chicago Metal Hose Corp., Maywood, Ill., 7 pages.

*Primary Examiner*—Robert K. Schaefer
*Assistant Examiner*—Gerald P. Tolin
*Attorney, Agent, or Firm*—Owen, Wickersham & Erickson

[57] ABSTRACT

Panel sections having internal conductive layers for transmitting electrical power or signal energy are interconnected to form an area type distribution system by flexible conductors connected to tab portions of the panel conductive layers extending into a flush enclosure formed by a recess on the side edge of each panel. An extensible and flexible tubular member retained at its opposite ends by the enclosures of adjacent panel sections provides a protective and shielded passage for the conductors between panel sections and also allows for dimensional variations between installed, adjacent panel sections.

12 Claims, 18 Drawing Figures

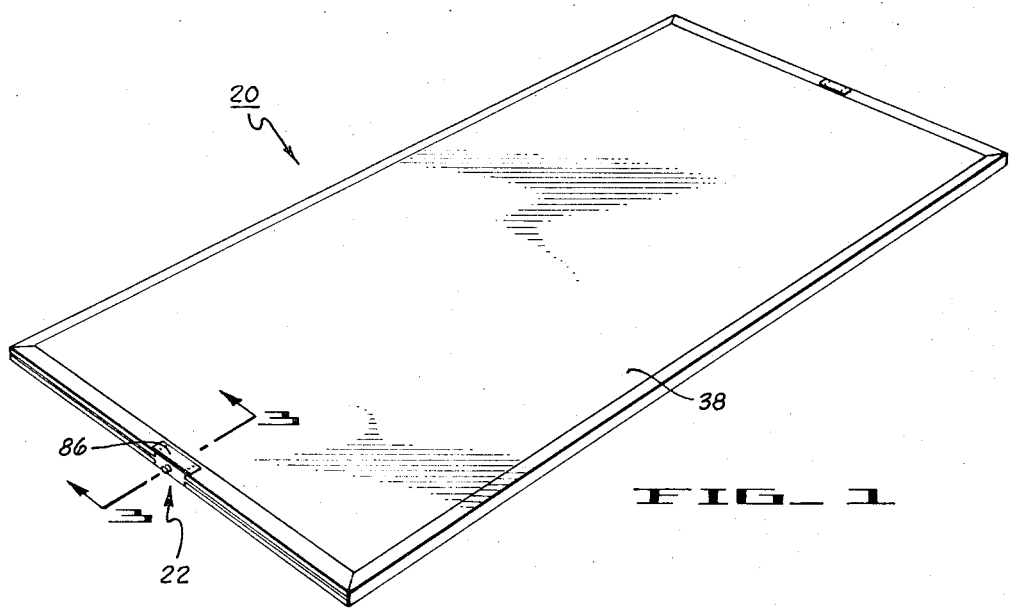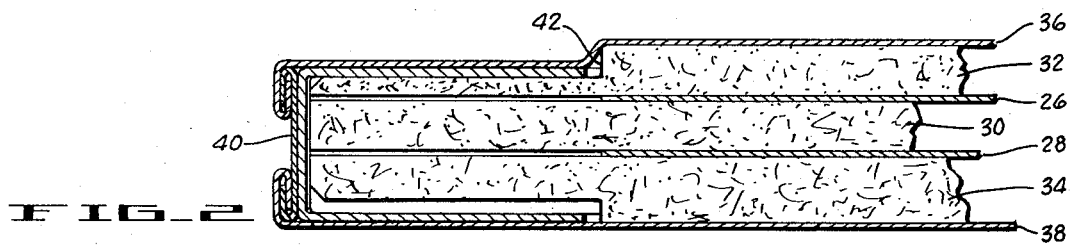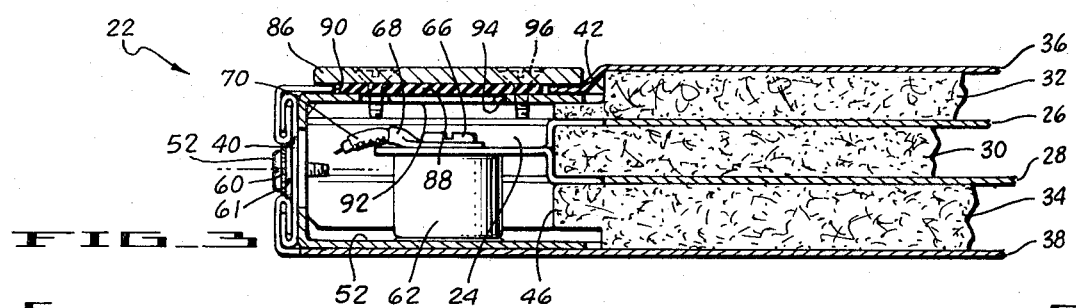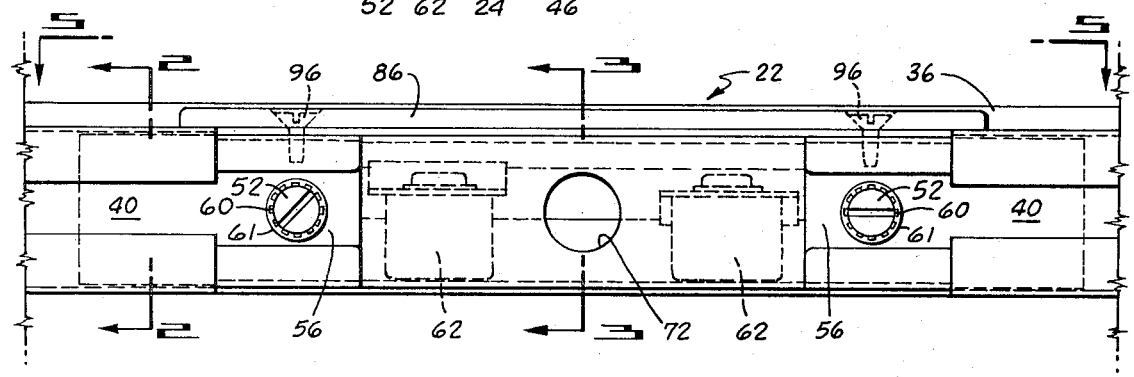

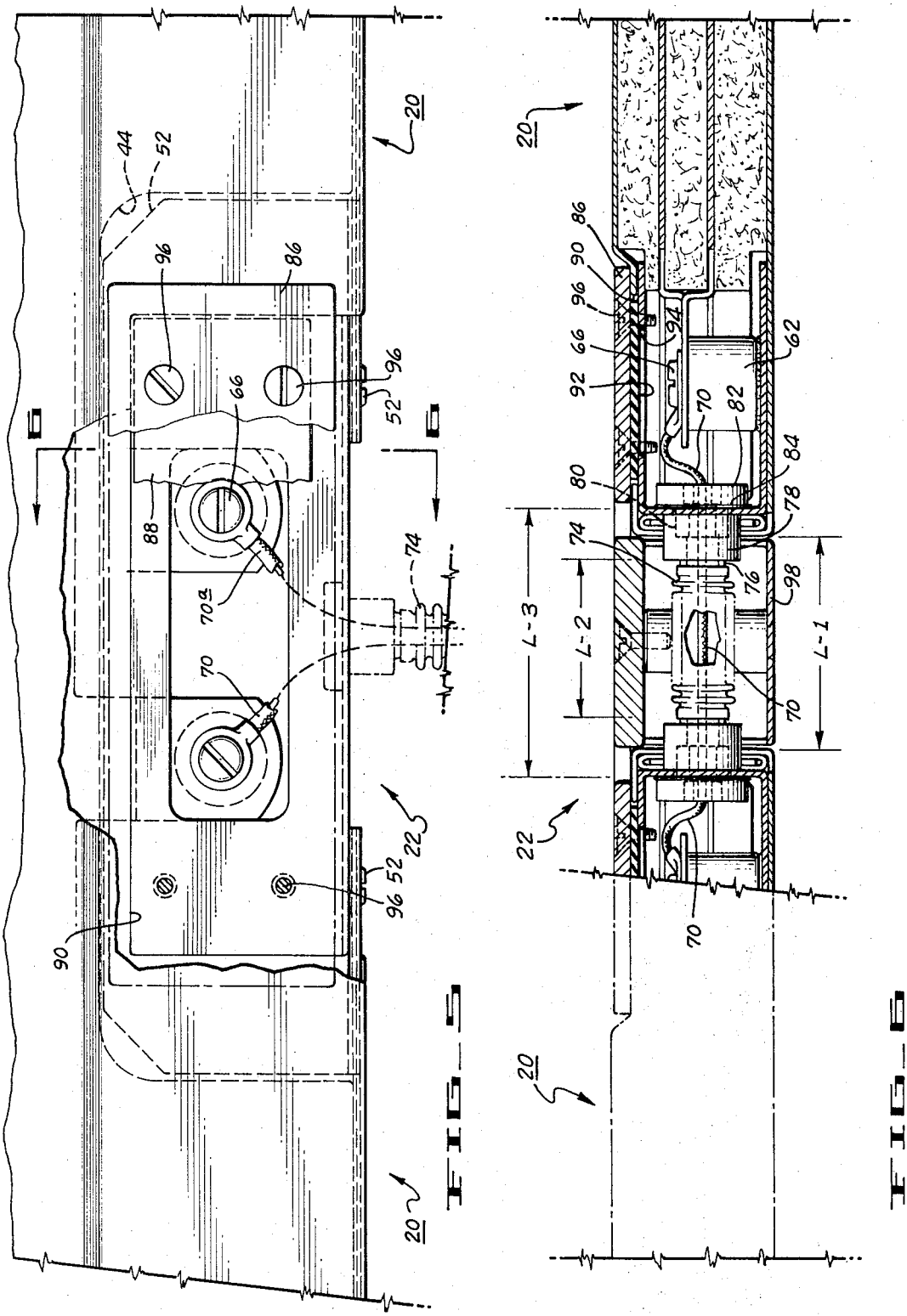

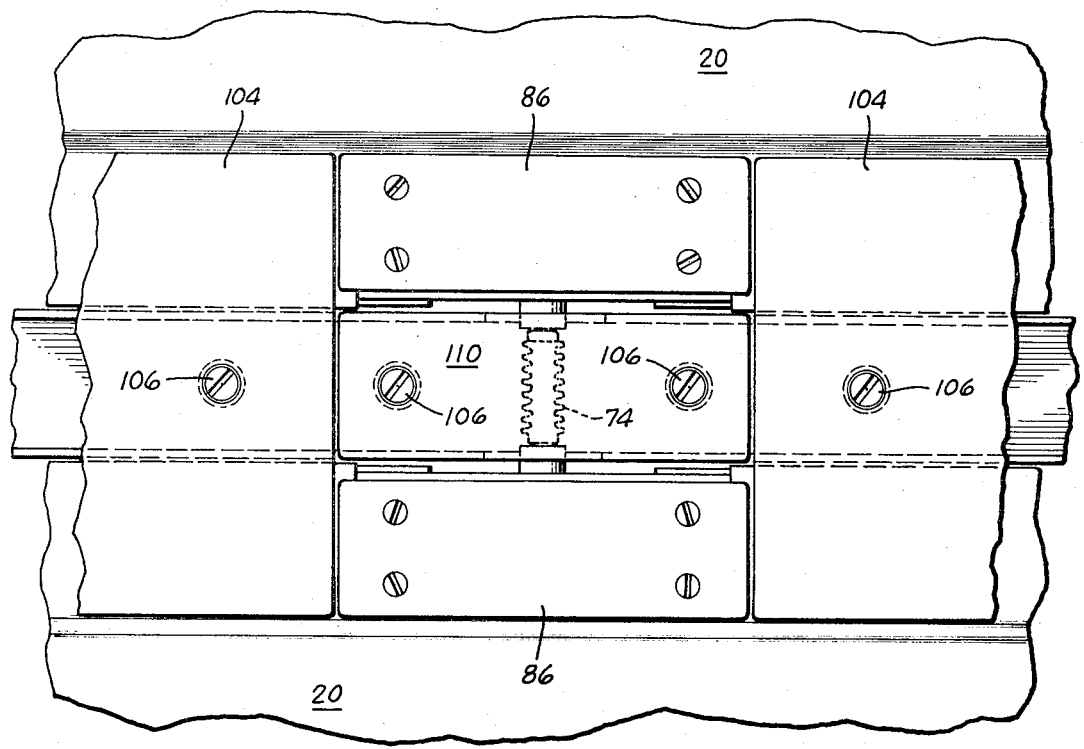
FIG_9
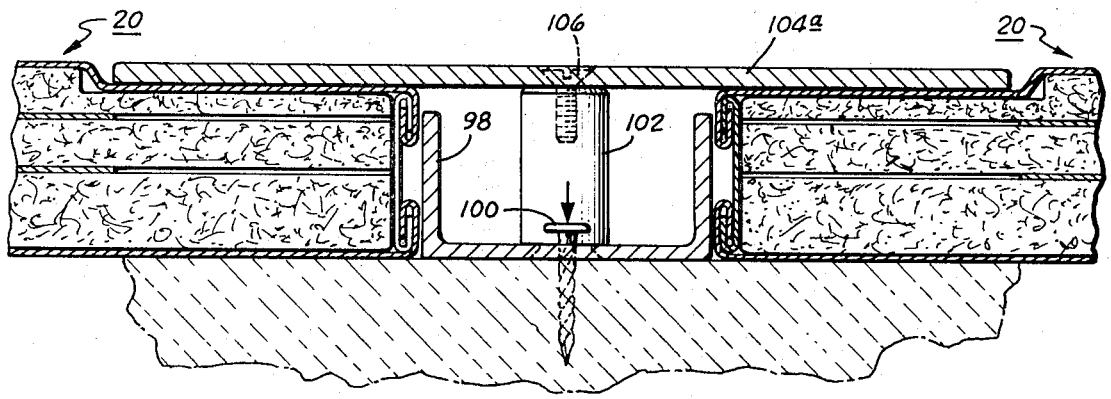
FIG_10
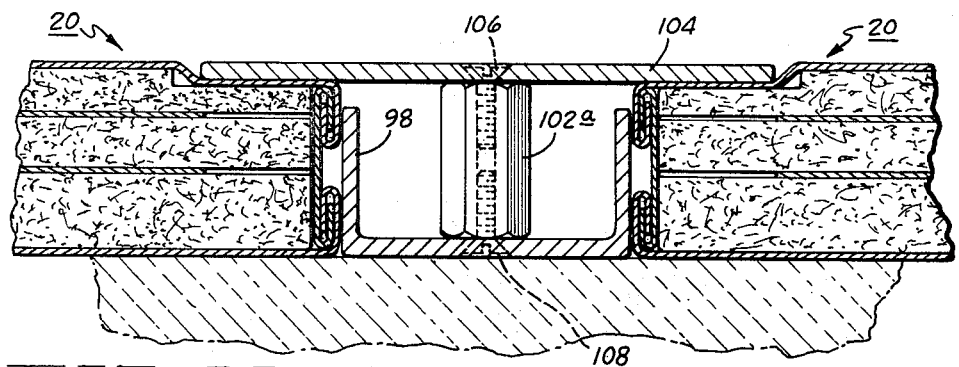
FIG_11

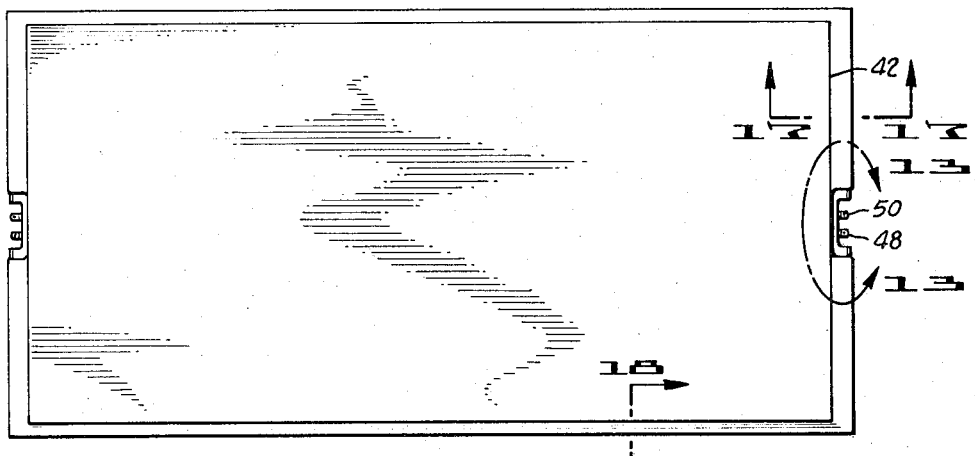
FIG_12
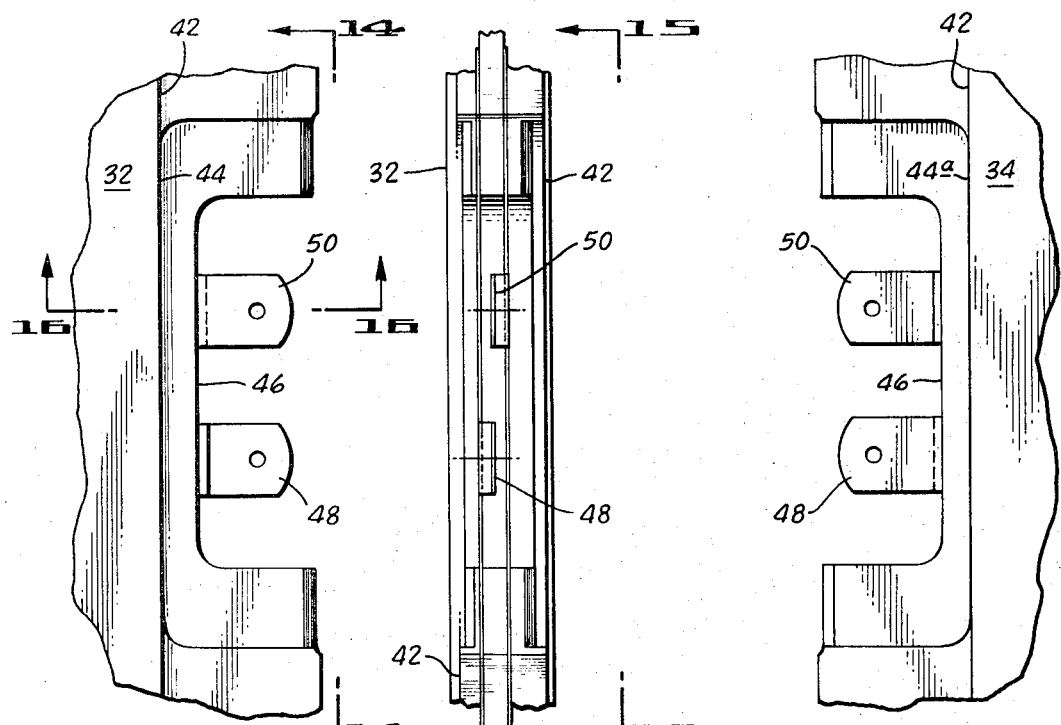
FIG_13  FIG_14  FIG_15
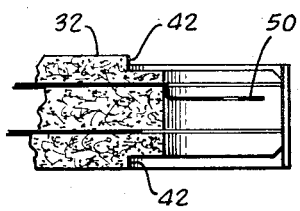
FIG_16
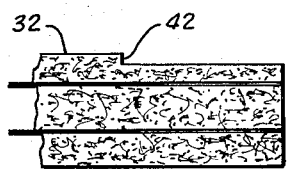
FIG_17
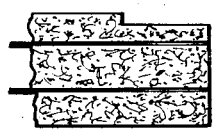
FIG_18

INTERCONNECTION ASSEMBLY FOR PANEL SECTIONS OF AREA TYPE ELECTRICAL DISTRIBUTION SYSTEM

BACKGROUND OF THE INVENTION

This invention relates to electrical interconnected devices and more particularly it relates to an interconnecting assembly for panel-like components of an area type electrical power and/or signal distribution system.

Such a distribution system, as shown in copending U.S. application Ser. No. 191,392 may comprise a series of panel sections, each section having a pair of internal, upper and lower conductive layers spaced apart by a layer of dielectric material. Similar dielectric layers are provided on top of the upper conductive layer and on the bottom of the lower conductive layer, and surrounding these are upper and lower external conductive layers that provide an electrical ground. In such an area type electrical distribution system, the panel sections are installed in a building floor area in groups of two or many more sections that must be electrically connected together as well as to electrical input and termination devices in a suitable manner. One problem in providing such a connection assembly lies in the necessity to minimize the time, complexity and skilled labor requirements for the assembly and installation of groups of panel sections in an area type system. Obviously, many such installations may involve large areas requiring many panel sections and therefore it must be possible to accomplish panel interconnections with a high order of integrity and reliability without difficulty. Another problem which arose with the installation of large numbers of panel sections was that of providing adequate protection and shielding of power and signal carrying conductors between panels, and yet another problem arose in accommodating dimensional irregularities that arose in various panel installations due to variations in overall panel dimensions as well as those of the installation area.

BRIEF SUMMARY OF THE INVENTION

In accordance with the present invention an electrical connector structure for laminated panels which solves the aforesaid problems is accomplished by providing each panel with a cutout or recess along one edge which is aligned with a similar recess on the adjacent panel section to be connected. Around each recess area is a channel member that is essentially flush with the nominal edge of the panel and forms an enclosure or cavity into which tab portions of the panel's internal conductive layers extend. An opening is provided in the web of each channel member and seated in this opening is one end of a tubular protective member having a bellows-like construction that extends between aligned channel members of adjacent panels. Conductors such as wires are fixed to the tab portions of adjacent, connecting panels in a panel group and extend through the tubular member which can extend or contract in length to accommodate changes in the distance between panels. The tubular member is easily installed and yet provides a fully protective enclosure that also shields the conductors from extraneous R.F. signal energy.

Accordingly, it is a general object of the present invention to provide an improved inter-panel connection for laminated panel sections of an area type electrical distribution system.

Another object of the present invention is to provide a connector structure for panels of an area type electrical distribution system that is easy to install without the need for highly skilled labor or special tools; that is effective to shield the panel interconnecting conductors from extraneous R.F. interference; that is safe and reliable and accomplishes a fixed ground connection when installed.

Yet another object of the present invention is to provide a connector unit for panels of an area type electrical distribution system that is extensible and contractable so as to accommodate differences in the distance between adjoining interconnected panel sections.

Another object of the present invention is to provide an improved panel section for use with an area type electrical distribution system that is particularly adaptable for accommodating a hollow, elongated, protective connector unit for the interconnecting panel conductors.

Still another object is to provide an improved method for connecting panel sections of an area type electrical distribution system.

A further more specific object of the present invention is to provide an electrical interconnection structure for panel sections of an area type electrical distribution system utilizing cutout enclosures in the side edges of adjacent panel sections being connected, terminal means within each enclosure formed by portions of the panel conductive layers being connected, and flexible hollow tubular conduit fixed at its ends to the enclosures of each panel section through which the connecting conductors extend.

Other objects, advantages and features of the present invention will become apparent from the following detailed description of one preferred embodiment.

BRIEF DESCRIPTION OF THE DRAWINGS

FIG. 1 is a view in perspective of a panel section for an area type electrical distribution system having a connector unit embodying the principles of the present invention;

FIG. 2 is an enlarged fragmentary view in section taken along line 2—2 of FIG. 4;

FIG. 3 is an enlarged view in section taken along line 3—3 of FIG. 2;

FIG. 4 is a fragmentary end view of a panel section in elevation taken along line 4—4 of FIG. 3;

FIG. 5 is a fragmentary top view of a panel section taken along line 5—5 of FIG. 4 with portions broken away to show the panel connector enclosure;

FIG. 6 is a view in elevation and in cross section taken at line 6—6 of FIG. 5 and showing two panel sections electrically interconnected in accordance with the principles of the present invention;

FIG. 9 is an enlarged view in section taken at line 9—9 of FIG. 8;

FIG. 10 is an enlarged view in section taken at line 10—10 of FIG. 8;

FIG. 11 is an enlarged view in section taken at line 11—11 of FIG. 8;

FIG. 12 is a plan view showing a panel section according to the present invention before its side connector has been installed;

FIG. 13 is an enlarged top plan view taken at line 13—13 of FIG. 12;

FIG. 14 is an enlarged side view in elevation taken at line 14—14 of FIG. 13;

FIG. 15 is an enlarged bottom plan view taken at line 15—15 of FIG. 14;

FIG. 16 is a view in section taken along line 16—16 of FIG. 13;

FIG. 17 is an enlarged view in section taken along line 17—17 of FIG. 12; and

FIG. 18 is an enlarged view in section taken along line 18—18 of FIG. 12.

DETAILED DESCRIPTION OF EMBODIMENTS

Figure 7:
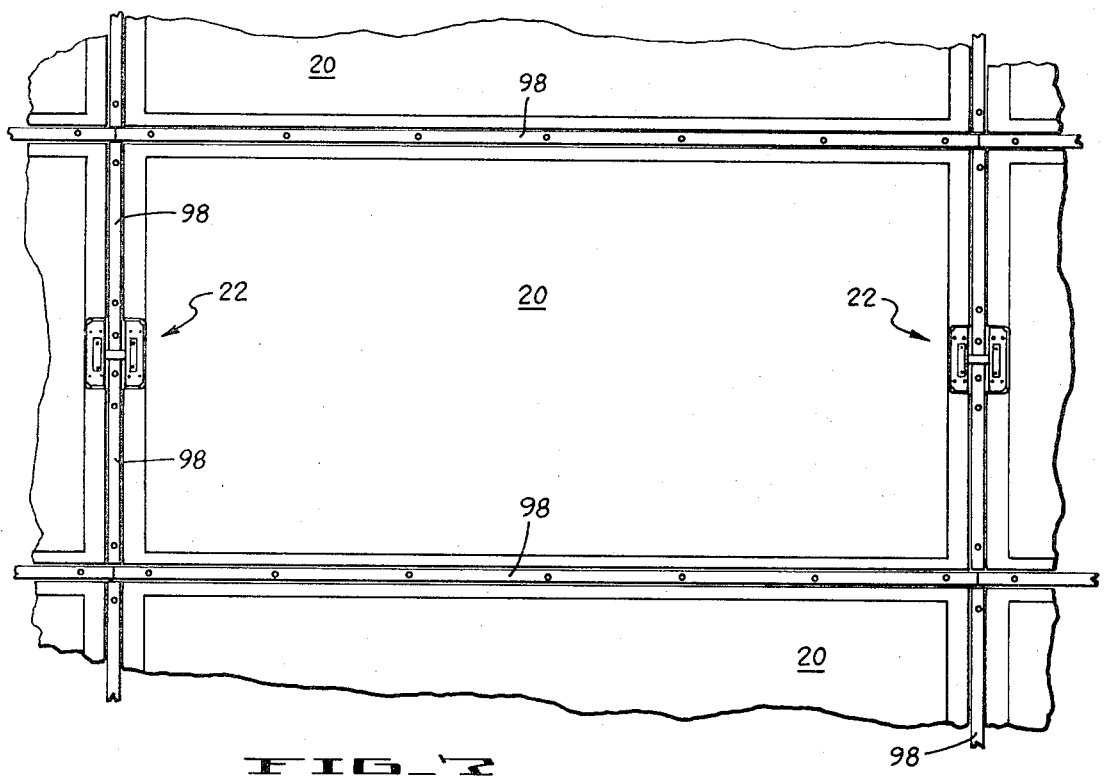
FIG. 7 is a plan view of several interconnected panel sections of an area type electrical distribution system shown with cover members of connector members removed.

With reference to the drawing, FIG. 1 shows a single panel section 20 for an area type power and signal distribution system. As described in detail in U.S. application Ser. No. 269,214 filed July 5, 1972, groups of such panel sections are used in such a system to cover floor areas of buildings or other structures to provide a means for transmitting electrical power and signal energy so that it can be accessible at any randomly selected location on one or more of the panel sections. When installed, the panel sections must be electrically connected together in groups or sub-circuits so that electrical power and signal energy can flow between them with a minimum amount of interference, noise or electrical losses and with complete reliability and safety.

Each panel section 20, as shown in FIGS. 2 and 3 comprises a pair of internal conductive layers 26 and 28 that extend substantially between its opposite sides and are spaced apart by a layer of dielectric material 30 of uniform thickness. The conductive layers 26 and 28 may be metal foil or sheet material such as steel, aluminum or copper having a uniform thickness in the range of .006 to .020 inches, and the dielectric layer 30 may be natural wood or compressed wood particles in sheet form or some suitable plastic material. Similar dielectric layers 32 and 34 are provided above and below the upper and lower conductive layers. Covering these dielectric layers are upper and lower sheets 36 and 38 of conductive material such as a metal foil or sheet material of uniform thickness (e.g., .026 inch low carbon sheet steel) that provide a protective ground sheath for the panel section. These outer sheets are each connected, as by a manufacturer's joint comprising interlocking flanges to a metal strip 40 that extends around the entire vertical edge of the panel section 20.

When the panel sections are installed in a typical area type power and signal distribution system, as on building floor surface, they are placed with the edges of adjacent panels spaced apart a substantially uniform distance, thereby forming elongated gaps between them which are utilized for tie down elements, as will be described later. To interconnect a pair of panel sections across such a gap, the conductive layers of both sections must be electrically connected to those of an adjacent section by means that will provide a safe, low resistance path for electrical power as well as for the passage signal energy with as little outside interference as possible. Generally, as shown in FIG. 1, the panel sections 20 have a rectangular configuration, and are connected in line by inter-panel connectors 22 at their ends. However, it will be readily apparent that such connectors could be used along the panel sides, if desired.

In the connector embodiment of FIGS. 1 – 6, the ends of a panel section are provided with a notched-out cavity 24 having a flush housing that contains terminals for each of the conductive layers. A preferred procedure for forming this cavity is shown in FIGS. 12 - 16. When the panel section is constructed, the top dielectric layer 32 is preferably provided with a first cutback recess 42 all along or around its entire edge. This recess which may be wider at the panel ends than along the panel sides is utilized to accommodate a tie-down strip when the panel sections are installed as will be described later. At the desired location for the connector 22 along an end edge another rectangular recess 44 is routed out on the top of the dielectric layer 32 which has the same width but goes slightly deeper than the edge recess 42. A similar but slightly deeper recess 44a is provided on the bottom surface of the dielectric layer 34 and vertically aligned with the recess 44. A third recess 46, also having a rectangular shape, but shorter in length than the recesses 44 and 44a and narrower than the edge recess 42 is provided inside the second recess. This third recess cuts completely through the panel thickness eliminating all of the dielectric material in its rectangular area and forming the cavity 24. Into this third recess extend a pair of tab portions 48 and 50 that are integral with the upper and lower conductive layers 26 and 28 respectively. One of these tabs is bent upwardly at its inner end and the other downwardly a small amount at its inner end so that they both terminate near the outer edge of the panel at substantially the same level. Now, as shown in FIGS. 2 - 4, a short housing member 52 having a channel shaped cross section fits over the edge of the panel section to help form a flush enclosure around the cavity 24. Preferably, as shown in FIG. 2, the channel member 52 has a web portion that is sized so that its upper and lower legs fit flush against the inside surfaces of the upper and lower conductive ground sheets 36 and 38. The outer edge portions of the upper channel leg extend over and contact the dielectric surface formed by the recess 44 while the similar edge portions of the lower channel leg extend over the surface of recess 44a. At its metal to metal contact areas, the channel member 52 is bonded to the upper and lower ground sheets by a suitable adhesive such as an epoxy. The web 54 of this channel member fits just inside and flush against the edge member 40. When the panel section 20 is constructed, a portion of this edge member is removed in front of the third recess 46 and spaced apart end portions 56 are formed that project beyond cutaway edges of the joint edges of the upper and lower conductive ground layers. Each end portion 56 overlaps the channel member and is secured to it by a machine screw 58 used with a toothed washer 60 and a flat washer 61 that combine to provide a good electrical joint.

Spaced apart and fixed as by bonding to the bottom flange of the channel member 52 are a pair of cylindrical spacer blocks 62. These blocks may be made of a suitable dielectric material such as a paper base phenolic and are positioned so that the tabs 48 and 50 will extend over them. A hole in each tab is aligned with a threaded bore in the block that can be conveniently provided by an embedded helical spring. A suitable terminal fastener such as a screw 66 extends through the end terminal 68 of a connector wire 70 and into the threaded bore of each spacer block. Thus, a pair of connector wires 70 and 70a, one for each conductive layer of the panel, extend from the connector blocks, and these wires, as shown in FIGS. 5 and 6, pass through a central opening 72 in the vertical web portion of the channel member 52.

Turning to FIGS. 5 and 6, it is seen that an extensible, flexible conduit 74 extends between adjacent spaced apart panel sections 20 to provide a protective, shielding passage for the connector wires in accordance with the invention. This conduit may be in the form of a metal bellows member made of a thin resilient metal and having a series of uniform convolutes, although other forms of flexible conduits such as those formed by stranded or woven wire may be used. Any number of convolutes may be used depending on the desired nominal spacing of the panel sections, but as characteristic of such bellow devices a considerable amount of stretch or contraction can be provided from the nominal length to accommodate a range of variations in panel spacing. Each tubular end of the bellows member is fixed, as by brazing, to the cylindrical end of a tubular coupling member 76 having an enlarged end portion 78 with female threads. The end face of this end portion is flat and adapted to bear against the outer surface of the channel member 52. Threadedly engaged with the female threads of each coupling end portion 78 is a threaded barrel portion of an interconnect feed through 80 having an enlarged unthreaded head portion 82 that extends within a cavity 24. A toothed washer 84 is located between the inside surface of the channel web 54 and the enlarged head portion 82 so that a firm electrical connection can be made. Thus, it is seen that the installation of the connector is easily accomplished since the central conduit member is merely placed between the channel openings of adjacent panels and a feed through 80 is screwed into each of its threaded ends from the cavity formed inside the channel member 52 of each panel section. Thereafter, the connector wires extending through the flexible conduit can be attached to their respective terminal blocks.

Access to the cavity 24 for connecting the feed through members 80 and the connector wires is provided by means of a removable cover plate 86. This plate is preferably metal and has a thickness that causes its upper surface to be flush with the surface of the upper ground sheet when installed. Bonded to the underside of the plate is a gasket 88 made of a conductive sheet material that provides R.F. shielding as well as serving as a water barrier. Such a sheet material may be an elastomeric with embedded fine wires. The shape and size of this gasket is only somewhat smaller than an opening 90 in this ground layer above the cavity. Fixed by an adhesive to the underside of the gasket 88 is another sheet member 92 made of some suitable electrically insulating paper material such as "fish paper" having the same shape but slightly smaller than an elongated opening 94 in the upper leg of the channel member 52. A series of tapped holes surrounding the opening 94 are provided in the channel member to receive an equal number of machine screws 96 that hold the cover member in place.

In a typical installation of an area type power and signal system, adjacent panel sections 20 are spaced apart along their sides and ends by channel members 98, as shown in FIGS. 6, 10 and 11. This web of each channel member lies flush with the floor surface with its legs extending upwardly. At intervals along the web a suitable fastener 100 extends through it and into the base floor structure. These fasteners may be nails, screws or explosive driven fasteners commonly used in concrete. Also attached to the channel at spaced apart intervals are spacer members 102 that provide an anchorage for a tie down strip that overlaps adjoining panel sections.

In the embodiment of FIG. 10, the spacer is shown as a cylindrical block which is swaged at its lower end to the channel web. At its upper end a tapped hole receives a screw 106 that extends through the tie down strip. In the modified version of FIG. 11 the spacer member is an elongated hexagonal nut 102a that is secured to the channel web by a machine screw 108 at the bottom. At the top, the tie down strip is secured by screws 106 as with the other spacer member.

FIG. 9 shows in plan view a fully installed series of cover plates over a connector assembly for adjoining panel sections including the tie down strip 104, a pair of cavity cover plates 86 and a central cover plate 110 that is attached to a pair of spacer members 102 and located between the panel cavity cover plates 86.

Figure 8:
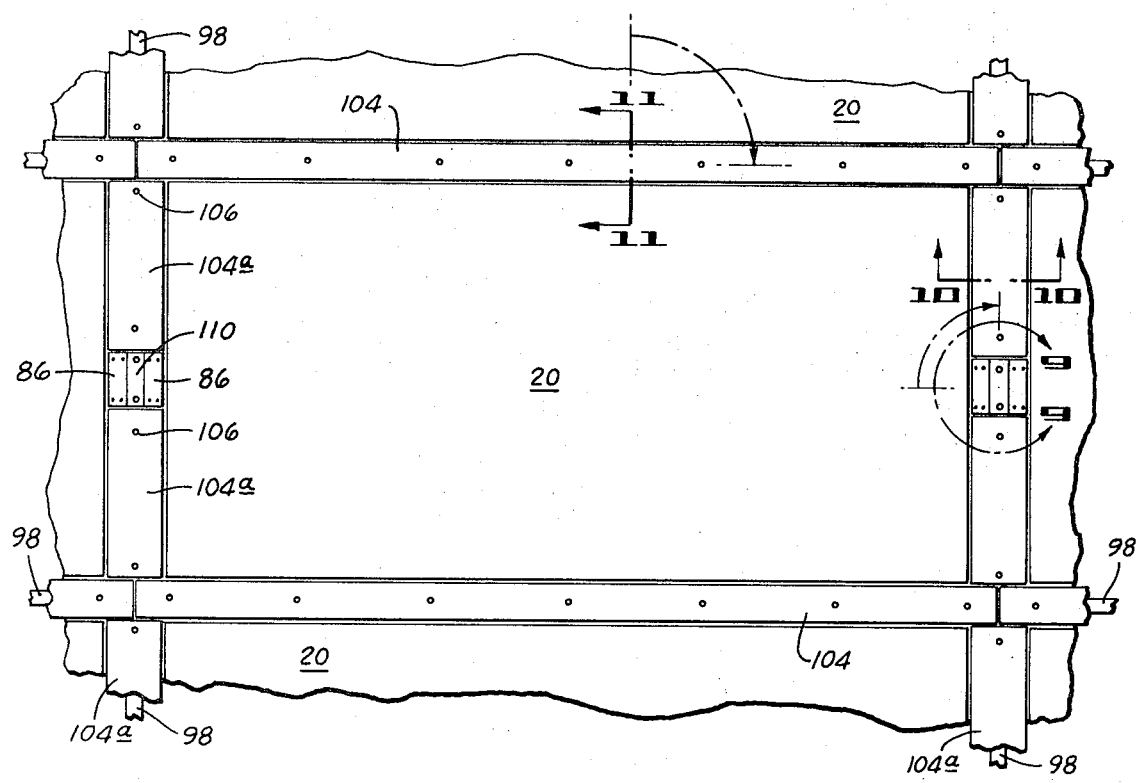
FIG. 8 is a plan view similar to FIG. 7 showing the cover members of the interconnected and adjacent panel sections installed in place.

In FIG. 7, a typical installation of interconnected panels 20 forming an area type electrical distribution system is shown using the connectors 22 of the present invention. FIG. 7 shows the panels spaced apart by the channel members 98 which are secured to the base floor and with all tie down strips removed. FIG. 8 shows the panels of FIG. 7 with all of the tie down strips 104 and 104a at the sides and ends of adjacent panels and the plates 110 and 86 over the connectors 22 in place.

From the foregoing, it should be apparent that the present invention provides a connector assembly for panel sections of an area type power and signal distribution system that readily solves the panel interconnector problem. The flexible conduit for the connector wires provides reliable, electrical protection by assuring a constant electrical ground and it also provides an efficient shielding cover that prevents any significant interference with signal transmissions. Yet, the flexibility of the conduit allows for considerable disparity in the positioning of adjacent panels when it is unavoidable due to base floor conditions. Moreover, the installation is a simple procedure and can be performed by relatively unskilled personnel without the need for special tools. Once installed, inspections can be quickly and easily made.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In an area type power and signal transmission system comprised of a plurality of laminated panels each having a pair of internal upper and lower conductive layers separated by a non-conductive layer, with additional non-conductive layers on the top and bottom of said upper and lower conductive layers respectively and covered by top and bottom conductive layers that are grounded and connected by a peripheral conductive edge strip, a connector assembly for electrically interconnecting adjacent pairs of said panels comprising:

means forming a cavity extending inwardly from the side edge of each adjacent panel, a tab portion of each said internal conductive layer extending therefrom into said cavity but terminating inside of said peripheral edge strip of the panel;
enclosure means on each said panel section forming a housing around said cavity and said tab portions, said enclosure means having an elongated sidewall that is substantially flush with said panel side edge containing said cavity; and
a pair of interconnecting conductors extending between adjacent panels with the ends of said conductors extending through an opening into said cavity of each said panel, and means for holding the ends of said conductors in contact with said tab portions within each said cavity in adjacent panels.

2. The connector assembly as described in claim 1 including flexible conduit means having a rigid end portion at each end fixed to a said enclosure means around its opening, said conduit means extending between adjacent panel sections and surrounding said conductors thereby providing them with a protective, shielding cover wherein said flexible conduit means comprises a tubular metallic member having a series of convolutions providing an extensible, bellows-like capability and means on the opposite ends of said tubular member for removably securing said flexible conduit means to said enclosure means.

3. The connector assembly as described in claim 2 wherein said means for securing said flexible conduit means comprises annular coupling members fixed to the opposite ends of said tubular member and having a series of threads for retaining a feed through member located within a said cavity.

4. The connector assembly as described in claim 1 wherein said means for holding said conductors in contact with said tab portions include dielectric spacer means fixed to one wall of each said enclosure and fastener means extending through the ends of each said conductor and a said tab portion and secured in said spacer means.

5. The connector assembly as described in claim 1 wherein said enclosure means comprises a channel member having leg portions that lie flush against the inside surfaces of said top and bottom conductive layers, said leg portions being connected by a web portion that is secured to said panel edge strip.

6. The connector assembly as described in claim 5 including a removable cover for each said enclosure on a panel, said cover comprising an upper plate removably fastenable to and shaped to extend over an opening in the upper leg of said channel member, and means on the underside of said upper plate for absorbing R.F. energy.

7. The connector assembly as described in claim 1 including elongated channel members for spacing adjacent panels apart, each said channel member being located between a pair of adjacent panels with the channel web portion flush against a supporting floor surface and its leg portions extending along the panel edges; fastener means spaced apart along and extending through said web portion; and notched out areas in said leg portions to accommodate said flexible conduit means.

8. For use in an area type power and signal transmission system, a laminated panel comprising:
a pair of internal upper and lower conductive layers separated by a non-conductive layer, additional non-conductive layers on the top and bottom of said upper and lower conductive layers respectively, and top and bottom conductive layers connected by a peripheral conductive edge strip, and a connector means to facilitate the electrical interconnection of said panel with an adjacent like panel in said system, said connector means comprising:
a cavity in at least one side edge of said panel with a tab portion of each said internal conductive layer extending therefrom into said cavity but terminating inside of said peripheral edge strip of the panel;

enclosure means on said panel section forming a housing around said cavity and said tab portions, said enclosure means having an elongated sidewall that is substantially flush with said panel edge strip and an opening for conductor means extending from an adjacent panel; and
means adjacent said tab portions within said cavity for holding the ends of said conductor means in contact with said tab portions within each said cavity.

9. The laminated panel as described in claim 8, including a flexible conduit means having a rigid end portion at each end fixed to a said enclosure means around its said opening, said conduit means being adapted to extend from said panel to an adjacent panel section while surrounding said conductor means to provide them with a protective and electrically shielding cover, said flexible conduit means comprising a tubular metallic member having a series of convolutions providing an extensible capability and means on the opposite ends of said tubular member for removably securing said flexible conduit means to said enclosure means.

10. The connector means as described in claim 9 wherein said means for securing said flexible conduit means comprises annular coupling members fixed to the opposite ends of said tubular member and having a series of threads for retaining a feed through member located within a said cavity.

11. The connector means as described in claim 8 wherein said means for holding said conductors in contact with said tab portions including a spacer means of dielectric material fixed to one wall of said enclosure and fastener means extending through the ends of each said conductor means and a said tab portion and secured in said spacer means.

12. The connector assembly as described in claim 8 wherein said enclosure means comprises a channel member having parallel, spaced apart leg portions that lie flush against the inside surfaces of said top and bottom conductive layers of said panel, said leg portions being connected by a web portion that is secured to and aligned with said panel edge strip.

* * * * *